United States Patent
Alexandron et al.

(10) Patent No.: US 8,595,407 B2
(45) Date of Patent: Nov. 26, 2013

(54) REPRESENTATION OF DATA RELATIVE TO VARYING THRESHOLDS

(75) Inventors: Nimrod Alexandron, Shimshit (IL); Alexander Rabinovitch, Kfar Yona (IL); Leonid Dubrovin, Karney Shomron (IL)

(73) Assignee: LSI Corporation, San Jose, CA (US)

( * ) Notice: Subject to any disclaimer, the term of this patent is extended or adjusted under 35 U.S.C. 154(b) by 168 days.

(21) Appl. No.: 13/159,670

(22) Filed: Jun. 14, 2011

(65) Prior Publication Data

US 2012/0324136 A1 Dec. 20, 2012

(51) Int. Cl.
  *G06F 13/40* (2006.01)
(52) U.S. Cl.
  CPC .................................. *G06F 13/4018* (2013.01)
  USPC .......................................................... 710/307
(58) Field of Classification Search
  USPC ...................... 710/104–107, 305–308, 58–61
  See application file for complete search history.

(56) References Cited

U.S. PATENT DOCUMENTS 3,688,266 A * 8/1972 Watanabe et al. ............. 382/267
7,243,204 B2 7/2007 Citron ........................... 711/171
2003/0036259 A1 2/2003 Tate et al. ...................... 438/622
2007/0033353 A1* 2/2007 Jeddeloh ........................ 711/154
2008/0183903 A1* 7/2008 VanStee et al. .................... 710/5

OTHER PUBLICATIONS

Yang, Jun, et al. "Frequent Value Compression in Data Caches", Microarchitecture, 2000, MICRO-33, Proceedings, 33rd Annual IEEE/ACM International Symposium, Dec. 2000, 9 pages.
Citron, Daniel, et al., "Creating a Wider Bus Using Caching Techniques", 1st IEEE Symposium on High-Performance Computer Architecture, Jan. 1995, 11 pages.
Kant, Krishna, et al., "Compressibility Characteristics of Address/Data Transfers in Commercial Workloads", Eighth International Symposium on High Performance Computer Architecture, Feb. 2, 2002, 16 pages.

* cited by examiner

*Primary Examiner* — Raymond Phan
(74) *Attorney, Agent, or Firm* — Christopher P. Maiorana, PC

(57) ABSTRACT

An apparatus having first and second circuits is disclosed. The first circuit may be disposed on a first side of a bus and configured to store thresholds in a first memory. Each threshold generally represents a respective one of a plurality of regular bit patterns in first data. The first circuit may also be configured to generate second data by representing each respective first data as (i) an index to one of the thresholds and (ii) a difference between the one threshold and the respective first data. A width of the bus may be narrower than the respective first data. The second circuit may be disposed on a second side of the bus and configured to (i) store the thresholds and a plurality of items in a second memory and (ii) reconstruct the first data by adding the respective thresholds to the second data in response to the items.

20 Claims, 4 Drawing Sheets

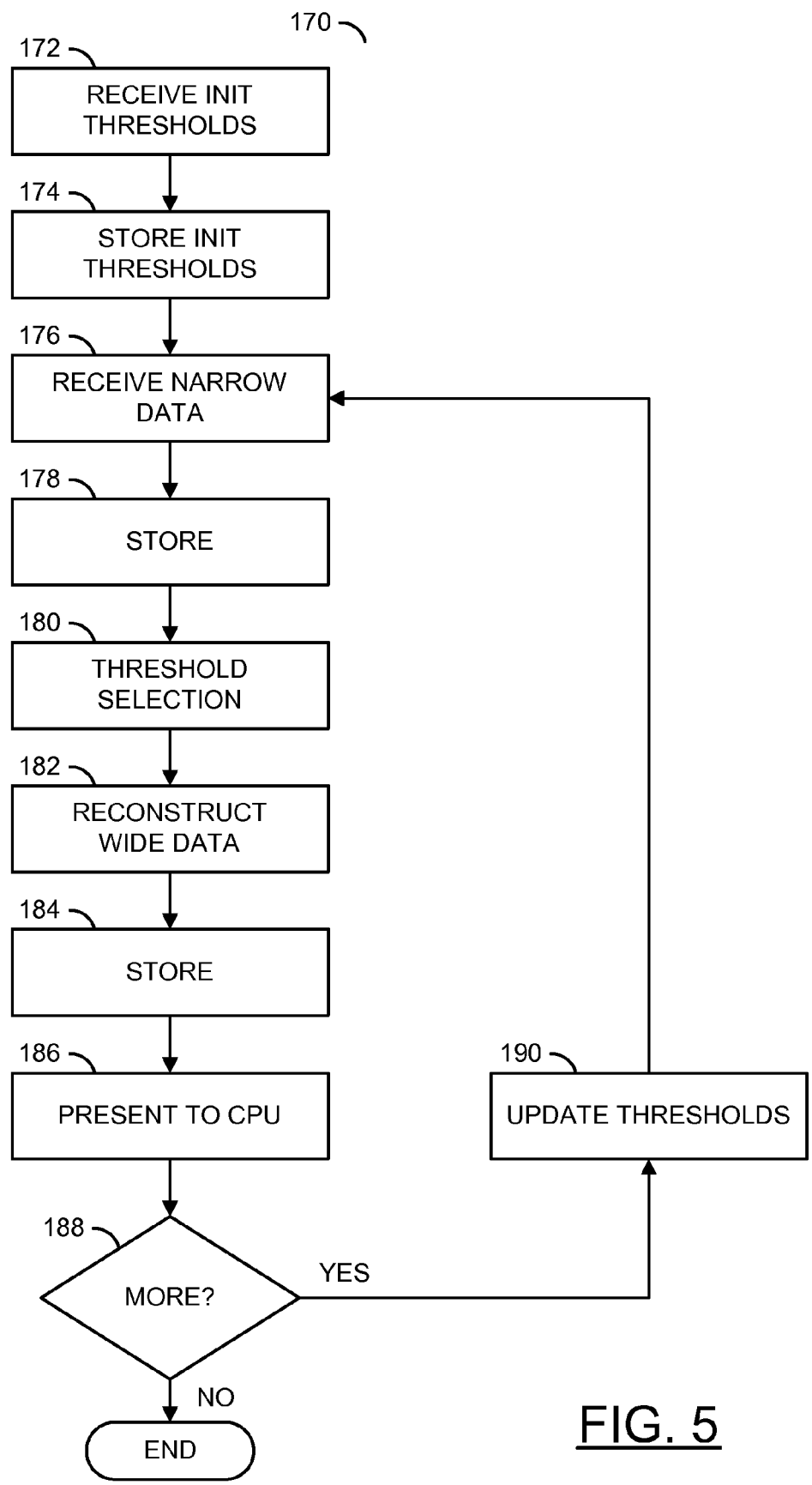

REPRESENTATION OF DATA RELATIVE TO VARYING THRESHOLDS

FIELD OF THE INVENTION

The present invention relates to data width reduction generally and, more particularly, to a method and/or apparatus for implementing a representation of data relative to varying thresholds.

BACKGROUND OF THE INVENTION

Increasing a data bandwidth from a core processor to a memory is a known issue in conventional digital signal processor devices. Demands of the core processor for data typically result in device designs that have wide busses and large memories to support the demands. The growth of the memories and the bus widths have drawback effects on an area, a wire density, a power consumption and a maximum clock frequency of the devices. The disadvantages contradict the purpose of improving the overall performance of the device.

It would be desirable to implement a representation of data relative to varying thresholds.

SUMMARY OF THE INVENTION

The present invention concerns an apparatus having a first circuit and a second circuit. The first circuit may be disposed on a first side of a bus and configured to store a plurality of thresholds in a first memory. Each of the thresholds generally represents a respective one of a plurality of regular bit patterns in a plurality of first data. The first circuit may also be configured to generate a plurality of second data by representing each respective first data as (i) an index to one of the thresholds and (ii) a difference between the one threshold and the respective first data. A width of the bus may be narrower than the respective first data. The second circuit may be disposed on a second side of the bus and configured to (i) store the thresholds and a plurality of items in a second memory and (ii) reconstruct the first data by adding the respective thresholds to the second data in response to the items.

The objects, features and advantages of the present invention include providing a representation of data relative to varying thresholds that may (i) perform data width reduction based on predefined threshold values, (ii) perform data width reduction based on threshold values calculated on-the-fly, (iii) utilize regularity in the data to determine the thresholds, (iv) store the reduced width data in a local memory, (v) reconstruct the full width data before storing in the local memory, (vi) reconstruct the full width data before presentation to a processor and/or (vii) transfer the reduced width data over a narrow bus.

BRIEF DESCRIPTION OF THE DRAWINGS

These and other objects, features and advantages of the present invention will be apparent from the following detailed description and the appended claims and drawings in which:

FIG. 5 is a flow diagram of an example method for reconstructing the data items.

DETAILED DESCRIPTION OF THE PREFERRED EMBODIMENTS

Some embodiments of the present invention generally perform a data width reduction based on predefined thresholds values or calculated on-the-fly threshold values. The resulting reduced representation (or reduced width) data items (or data words) may be sent over a bus. A width of the bus may be less than the width (e.g., bit width) of the full width data items prior to the data width reduction. A data size (e.g., number of bits in the data value) is generally stored in a memory along with the data items. Multiple thresholds may be applied to multiple data items according to the data size using any regularity existing in the data. After being transferred across the bus, the data items may be reconstructed before being stored to a local memory of a processor (e.g., central processor unit). In some embodiments, the data items may be stored in the local memory at the reduced size and reconstructed before presentation to the processor.

Figure 1:
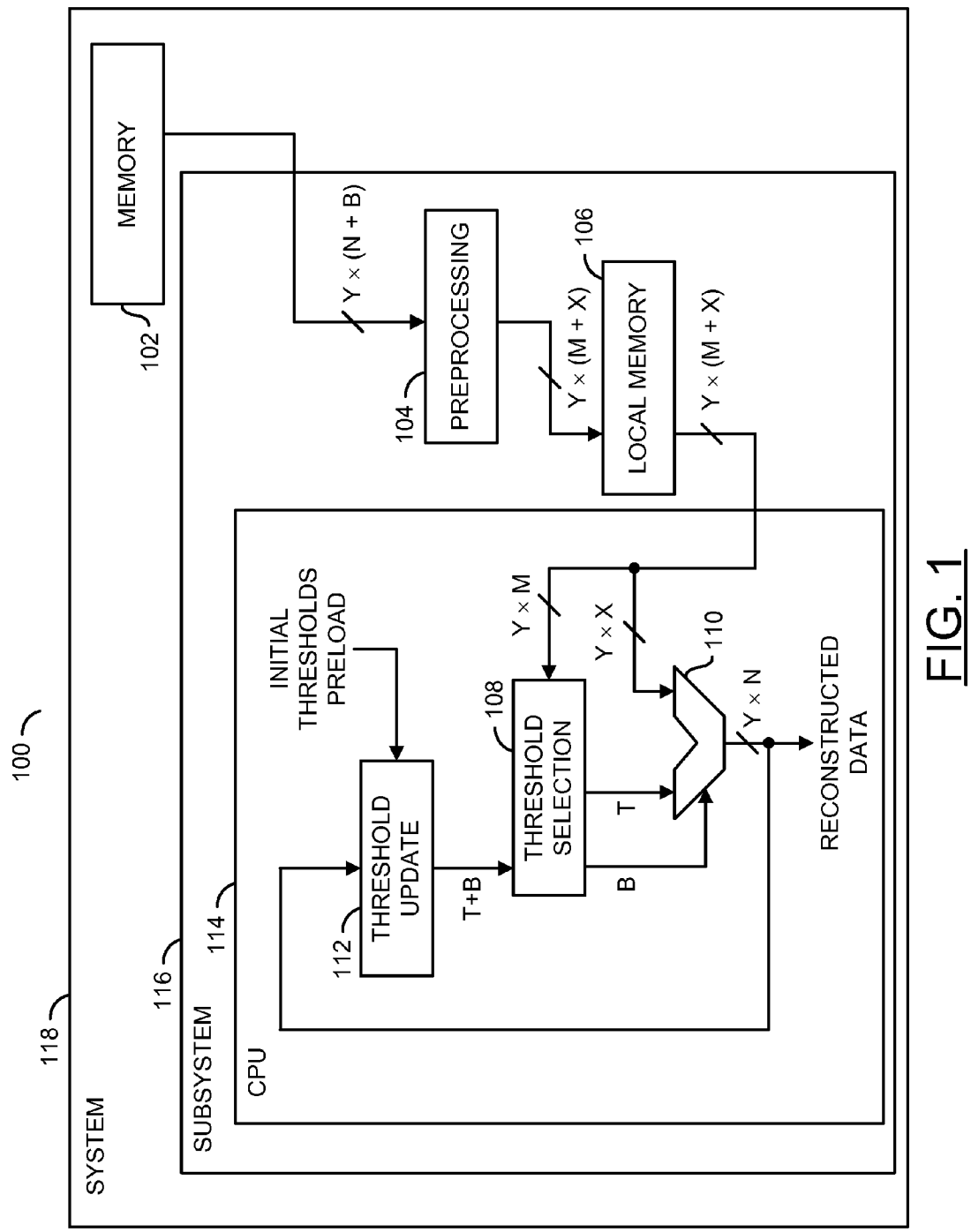
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (or device or system or integrated circuit) 100 generally comprises a block (or circuit) 102, a block (or circuit) 104, a block (or circuit) 106, a block (or circuit) 108, a block (or circuit) 110 and a block (or circuit) 112. The circuits 102 to 112 may represent modules and/or blocks that may be implemented as hardware, software, a combination of hardware and software, or other implementations. The circuits 108-112 may be formed (or grouped or combined) as part of a processor level 114 of the apparatus 100. The circuits 104-106 and the processor level 114 may be formed (or grouped or combined) as part of a system level 116 of the apparatus 100. The circuit 102 and the subsystem 116 may be formed (or grouped or combined) as a system level 118 of the apparatus 100. Other groupings may be established to meet the criteria of a particular application.

The circuit 102 may implement a memory circuit. The circuit 102 is generally operational to store a block of data items to be transferred to and used at the processor level 114. The block of data items may include multiple types of data. The data types may include, but are not limited to, integer, fixed point, 2's complement, and floating point data types. The block of data items may include multiple widths of data. The data widths may vary based on the types of data (e.g., floating point values generally have more bits than integer values). The data widths may also vary based on a nature of the data items. For example, video pixel data is generally represented as 24-bit values for full color pixels and 8-bit values for individual luminance samples and chrominance samples. In some embodiments, the circuit 102 may be fabricated on the same die as the subsystem level 116. For example, the circuit 102 may be a solid state memory circuit fabricated on the same die as the circuitry in the processor level 114. In other embodiments, the circuit 102 may be fabricated apart from the subsystem level 116. For example, the circuit 102 may be a solid state memory (e.g., a double data rate memory) fabricated on a different die than the circuitry in the subsystem level 116. In another example, the circuit 102 may be a hard drive memory and the subsystem level 116 may be fabricated on a die. Other types of memories may be implemented to meet the criteria of a particular application.

Each of several (e.g., Y) data items stored in the circuit 102 may have a data width (e.g., N bits). Each data item may also have one or more corresponding items (e.g., B bits) that convey the data type information and/or the data width information. As such, while transferring a block of the data items to the processor level 114, the circuit 102 may present a total of Y×(N+B) bits to the circuit 104.

The circuit 104 may implement a preprocessing circuit. The circuit 104 is generally operational to process the data items received from the circuit 102 to reduce an overall width (e.g., number of bits) used to represent the data items. The reduced representation (or narrow width data items) may be transferred on a parallel bus to the circuit 106. In the reduced representation, each data item in the block may have (i) an index value (e.g., M bit) pointing to a threshold (e.g., T) and (ii) a difference (e.g., X bits) between that threshold being pointed to and the data item being processed. In some embodiments, the circuit 104 may be part of the system level 118. In other embodiments, the circuit 104 may be an integral part of the circuit 102.

The circuit 106 may implement a local memory circuit. The circuit 106 is generally operational to buffer the reduced representation data items as received from the circuit 104 via the bus. In some embodiments, the circuit 106 may implement a cache memory. In other embodiments, the circuit 106 may be part of the processor level 114. In yet other embodiments, the circuit 106 may be an internal part of a processor.

The circuit 108 may implement a threshold circuit. The circuit 108 is generally operational to select a threshold value, data type information and/or data width information from the circuit 112 for each of the reduced width data items received from the circuit 106. Selection of the threshold values and data type/width information (or items) may be based on the index value. Each individual index value may be used to select a single threshold, a single data type and a single date width.

The circuit 110 may implement an adder circuit. The circuit 110 is generally operational to reconstruct the full width data items by adding the reduced width data items to the selected threshold values received from the circuit 108. The addition may be governed by the data type/data width information also received from the circuit 108.

The circuit 112 may implement a threshold update circuit. The circuit 112 is generally operational to store the threshold values, store the data type information and store the data width information. The circuit 112 may also be operational to analyze the reconstructed data items generated by the circuit 110 and update one or more of the thresholds at a time, along with the corresponding data type information and the data width information, based on the results of the analysis. In some embodiments, the initial thresholds, data type information and data width information may be loaded in a pre-load operation from a circuit external to the processor level 114. In other embodiments, the initial thresholds, data type information and data width information may be transferred to the circuit 112 from the circuit 104 across the bus.

The pre-processing performed by the circuit 104 may generate the reduced width data items (e.g., 8 bits) from the wide width data items based on the data type (e.g., integer, fixed point and/or floating point) and the data width (e.g., 16-bit, 24-bit and/or 32-bit). The width M (e.g., 4 bits) of the index values may be appended to the reduced width data items X. The bus may have a width of M+X bits (e.g., 4+8=12 bits), where X+M<N. The M-bit index generally provides for $2^M$ (e.g., $2^4$=16) threshold values. The $2^m$ threshold values may be grouped based on the data type/width B. A group of several thresholds may be established for each data width. For example a group comprising the thresholds 0-3 may be created for 16-bit data. A group comprising the thresholds 4-7 may be created for 24-bit data. A group comprising the thresholds 8-15 may be reserved for 32-bit data. Similar groupings corresponding to the data widths may be established for the various data types.

Consider a 16-bit wide integer read from the circuit 102. The circuit 104 may use a threshold 0-3 (e.g., threshold 2) to represent the 16-bit integer as a 4-bit index M and an 8-bit offset X. At the receiving end, the circuit 108 may use the index M to read the corresponding threshold T and data type/width B (e.g., threshold 2 for 16-bit integer data) from the circuit 112. The selected threshold T may be presented from the circuit 108 to the circuit 110. The data type/width B may also be presented from the circuit 108 to the circuit 110. The circuit 110 may use the data type/width B to determine how to add the threshold T to the offset X. In the example, the circuit 110 may add the 8-bit integer threshold T to the 8-bit integer offset X to reconstruct the 16-bit integer data item.

In another example, a 32-bit fixed point data item may be read from the circuit 102. The circuit 104 may use a threshold 8-15 (e.g., threshold 15) to reduce the bit-width from the 32 bits down to the 16-bit bus width M+X. When the circuit 108 receives the reduced width data item, the circuit 108 may read the appropriate threshold T and data width/type B from the circuit 112. The circuit 110 generally uses the data width/type B to add the 24-bit threshold T to the 8-bit offset X to generate the original 32-bit fixed point data.

In another example, a 32-bit integer data item may be read from the circuit 102. The circuit 104 may use a threshold 8-15 (e.g., threshold 10) to reduce the bit-width of the data item. However, the threshold 10 may be only a 16-bit threshold. Therefore, the circuit 104 may generate a 16-bit offset. The 16-bit offset may be transferred to the circuit 108 in two data transfer cycles on the bus. The index M corresponding to the initial offset may have a special value (e.g., 15) which signals that another index value and offset value will follow.

Figure 2:
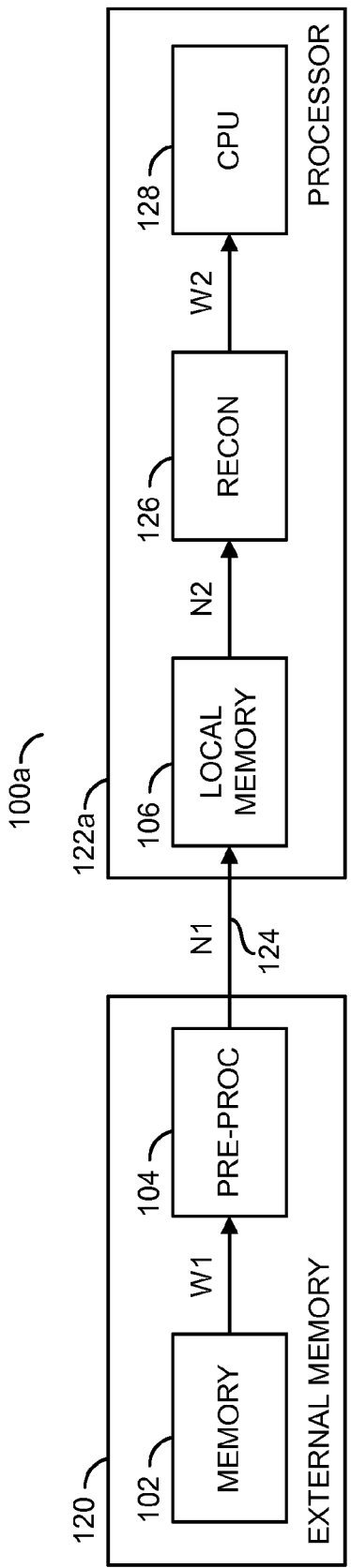
FIG. 2 is a block diagram of an example configuration of the apparatus.

Referring to FIG. 2, a block diagram of an example configuration of an apparatus 100a is shown. The apparatus 100a may be a variation of the apparatus 100. The apparatus 100a generally comprises a block (or circuit) 120, a block (or circuit) 122a and a bus (or communication line) 124. The circuit 120 generally comprises the circuit 102 and the circuit 104. The circuit 122a generally comprises the circuit 106, a block (or circuit) 126 and a block (or circuit) 128. The circuits 120 to 128 may represent modules and/or blocks that may be implemented as hardware, software, a combination of hardware and software, or other implementations.

A signal (e.g., W1) may be generated by the circuit 102 and presented to the circuit 104. The circuit 104 may generate a signal (e.g., N1) that is transferred across the bus 124 to the circuit 106. A signal (e.g., N2) may be generated by the circuit 106 and received by the circuit 126. The circuit 126 may generate a signal (e.g., W2) that is received by the circuit 128.

The circuit 126 may implement a reconstruction circuit. The circuit 126 is generally operational to reconstruct the full width (or wide) data items in the signal W2 from the reduced width (or narrow) data items received in the signal N2. The circuit 126 may comprise the circuits 108-112. In some embodiments, the circuit 126 may be part of the circuit 128.

The circuit 128 may implement a processor circuit. The circuit 128 is generally operational to execute software programs that utilize the full width data items received in the signal W2. In some cases, the software programs may generate new data items and/or modified data items from the reconstructed data items. The new and/or modified data items may be stored in the circuit 106 and/or in the circuit 102.

Figure 3:
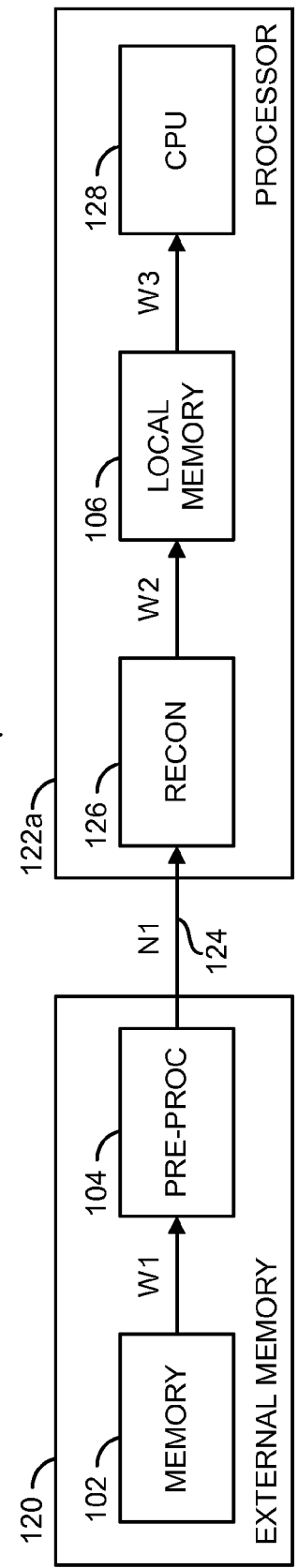
FIG. 3 is a block diagram of another example configuration of the apparatus.

Referring to FIG. 3, a block diagram of an example configuration of an apparatus 100b is shown. The apparatus 100b may be a variation of the apparatus 100. The apparatus 100b generally comprises the circuit 120, a block (or circuit) 122b and the bus 124. The circuit 122b generally comprises the circuit 106, the circuit 126 and the circuit 128. An arrangement of the circuits 106, 126 and 128 within the circuit 122b may be different that the arrangement of the same circuits within the circuit 122a. The circuits 120 to 128 may represent modules and/or blocks that may be implemented as hardware, software, a combination of hardware and software, or other implementations.

In the apparatus 100b, the signal N1 may be received by the circuit 126 (instead of the circuit 106). The circuit 126 may generate the signal W2 that is received by the circuit 106. A signal (e.g., W3) may be generated by the circuit 106 and received by the circuit 128 (instead of the signal W2).

Figure 4:
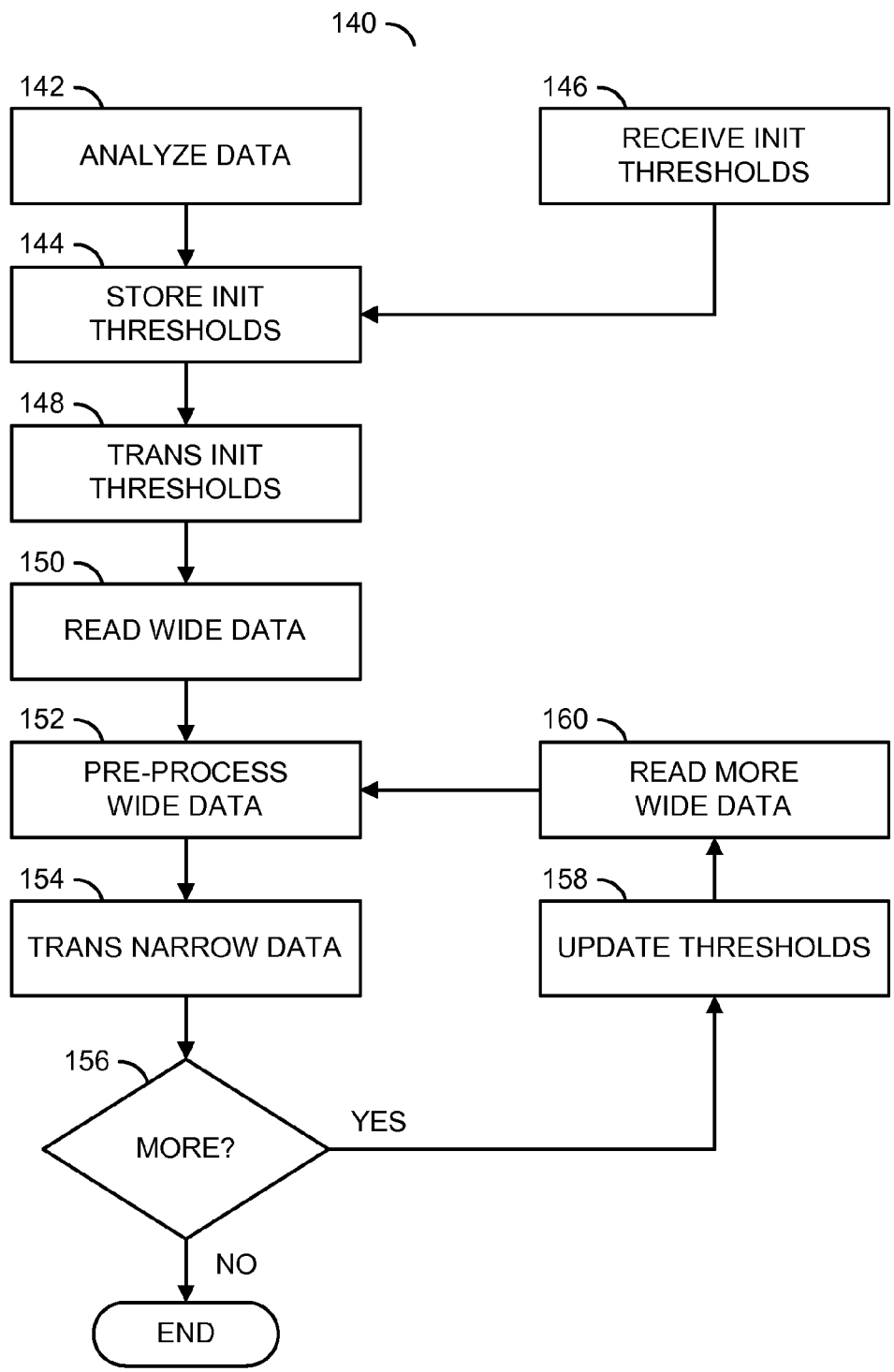
FIG. 4 is a flow diagram of an example method for representing the data items in reduced form.

Referring to FIG. 4, a flow diagram of an example method 140 for representing the data items in reduced form is shown. The method (or process) 140 may be implemented by the circuit 120. The method 140 generally comprises a step (or state) 142, a step (or state) 144, a step (or state) 146, a step (or state) 148, a step (or state) 150, a step (or state) 152, a step (or state) 154, a step (or state) 156, a step (or state) 158 and a step (or state) 160. The steps 142 to 160 may represent modules and/or blocks that may be implemented as hardware, software, a combination of hardware and software, or other implementations.

As the data items read from the circuit 102 are transferred to the circuit 106, the data items pass through the circuit 104. Because of the pre-processing performed by the circuit 104, the data width may be shrunk. The shrinkage is generally accomplished by representing the data items as offsets from a known threshold or thresholds. Although the data items are usually transferred in big chunks, the thresholds may be applied to the data items according to a width of single data value, making usage of data regularity. The thresholds may be either pre-loaded by from the system level 118 or calculated on-the-fly by the circuits 104 and 112. Calculating the thresholds on-the-fly generally means that the thresholds are updated during the data transfers, instead of remaining constant.

In the step 142, the circuit 106 may read and analyze the data items stored in the circuit 102. The analysis may search for multiple bit patterns in the data items that may be appropriate to use as the initial thresholds. A significant number (e.g., 100 to 1000 or more) of the data items may be analyzed to determine an initial set of thresholds. The analysis may separately consider the data items of each data type. The analysis may also separately consider the data items of each data width. As the thresholds are identified, the thresholds may be stored in the circuit 104 in the step 144. In some embodiments, the analysis of the data items may be performed external to the circuit 120. The thresholds resulting from the external analysis may be received by the circuit 120 in the step 146 and stored into the circuit 104 in the step 144. If the thresholds were determined by the circuit 106, the thresholds and corresponding data type information and data width information may be transferred via the bus 124 to the circuit 122a and/or 122b in the step 148.

In the step 150, the circuit 104 may read a (wide width) data item from the circuit 102 in the signal W1. Pre-processing of the read data item may be performed by the circuit 104 in the step 152. The narrow width data created by the pre-processing may be transmitted on the bus 124 via the signal N1 in the step 154 by the circuit 104. A check may be performed by the circuit 104 in the step 156 to determine if the circuit 122a and/or the circuit 122b had requested more data items to be sent via the bus 124. If more data items were requested, the circuit 104 may analyze the just-sent data item and update one or more of the thresholds in the step 158.

To avoid rapid changes to the stored thresholds, the analysis and update performed by the circuit 104 in the step 158 may include a filter operation. The filter operation may update one or more threshold values only after certain numbers of data items have been pre-processed using the threshold values. For example, the circuit 104 may conclude that a particular threshold should be optimized only after two or more data items using that particular threshold have been pre-processed. In another example, long trends in the pre-processed data items may be tracked. Where the trend indicates that the data items are deviating away from the existing set of thresholds, one or more new thresholds may be generated based on the trend. Likewise, the trend may indicate that one or more of the thresholds are no longer being used and thus may be eliminated from the set. In still other threshold update techniques, the oldest threshold or thresholds may be replaced by the newest threshold or thresholds.

Once the set of thresholds has been updated, the circuit 104 may read a next data item from the circuit 102 in the step 160. Pre-processing of the next data item may be performed in the step 152. The loop around the steps 152 to 160 and back step 152 may continue until the step 156 concludes that no more data items should be sent.

If a size of a narrow width data item is not small enough to fit the existing width of the bus 124, one or more additional data transfer cycles may be used in the step 154 to complete the data transfer. Thus, a tradeoff between a large bus size reduction and a small cycle penalty is generally established.

Referring to FIG. 5, a flow diagram of an example method 170 for reconstructing the data items is shown. The method (or process) 170 may be implemented by the circuit 122a and/or the circuit 122b. The method 170 generally comprises a step (or state) 172, a step (or state) 174, a step (or state) 176, a step (or state) 178, a step (or state) 180, a step (or state) 182, a step (or state) 184, a step (or state) 186, a step (or state) 188 and a step (or state) 190. The steps 172 to 190 may represent modules and/or blocks that may be implemented as hardware, software, a combination of hardware and software, or other implementations.

In the step 172, the circuit 122a/122b may receive the threshold values, data type values and data width values either from the circuit 120 or from an external source (e.g., the same external source that pre-loaded the values into the circuit 120). The initial threshold values, data type information and data width information may be stored in the circuit 112 in the step 174. In the step 176, the circuit 122a/122b may receive a data item in the signal N1 from the circuit 120 via the bus 124.

For the apparatus 122a, the received data item may be stored in the narrow width form in the circuit 106 in the step 178. When the data item stored in the circuit 106 is requested (e.g., read) by the circuit 128, the circuit 126 may select the corresponding threshold value, data type information and data width information in the step 180. Using the threshold value, data type information and data width information, the circuit 126 may reconstruct the wide width data item from the narrow width data item received via the signal N2 from the circuit 106. For the apparatus 122a, the step 184 may be eliminated. The reconstructed data item may be presented in the signal W2 to the circuit 128 in the step 188.

For the apparatus 122b, the data item received from the bus 124 may be processed by the circuit 126 in the steps 180 and 182. Therefore, the storage step 178 may be eliminated. The resulting reconstructed (wide width) data item may be stored in the step 184 into the circuit 106. The requested reconstructed data item may be presented in the signal W3 to the circuit 128 in the step 188.

A check may be performed in the step 188 to determine if the circuit 128 had requested more data items from the circuit 120. If more data items had been requested, the circuit 126 may update the set of thresholds in the step 190. The threshold value updates may be performed by the circuit 126 in the step 190 using the same technique as the circuit 104 in the step 158. Therefore, the same set of thresholds may be maintained on both sides of the bus 124. The method 170 may return to the step 176 and wait to receive the next data item from the bus 124. If no additional data items have been requested, the method 170 may end.

The functions performed by the diagrams of FIGS. 1, 4 and 5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 2 and 3 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit disposed on a first side of a bus and configured to (i) store a plurality of thresholds in a first memory, wherein each of said thresholds represents a respective one of a plurality of regular bit patterns in a plurality of first data, (ii) generate a plurality of second data by representing each respective one of said first data as (a) an index to one of said thresholds and (b) a difference between said one threshold and said respective first data and (iii) transmit said second data on said bus, wherein each of said second data is narrower than said respective first data and a width of said bus is narrower than said respective first data; and
a second circuit disposed on a second side of said bus and configured to (i) store said thresholds and a plurality of items in a second memory, (ii) receive said second data from said bus, (iii) select based on each of said indexes (a) one of said thresholds and (b) one of said items and (iv) reconstruct said first data by adding said thresholds to said differences in response to said items.

2. The apparatus according to claim 1, wherein said first circuit is further configured to update at least one of said thresholds in said first memory in response to said generating of at least two of said second data after said at least one threshold has been stored in said first memory.

3. The apparatus according to claim 1, wherein (i) said first data comprises a first subset and a second subset having different data widths and (ii) said items indicate said data widths.

4. The apparatus according to claim 1, wherein (i) said first data comprises a first subset and a second subset having different data types and (ii) said items indicate said data types.

5. The apparatus according to claim 1, wherein said first circuit is further configured to transfer at least one of said second data in at least two data transfers across said bus where said at least one second data is wider than said bus.

6. The apparatus according to claim 1, wherein at least two of said thresholds have different bit widths.

7. The apparatus according to claim 1, wherein said first circuit is further configured to generate said thresholds by analyzing said first data.

8. The apparatus according to claim 1, wherein said apparatus is configured to load said thresholds into said first memory and said second memory from an external source.

9. The apparatus according to claim 1, wherein said apparatus is implemented as one or more integrated circuits.

10. The apparatus according to claim 2, wherein said second circuit is further configured to update said at least one threshold in said second memory in response to said reconstructing of at least two of said first data after said at least one threshold has been stored in said second memory.

11. A method for a representation of a plurality of first data relative to a plurality of varying thresholds, comprising the steps of:
   (A) storing said thresholds in a first memory on a first side of a bus, wherein each of said thresholds represents a respective one of a plurality of regular bit patterns in said first data;
   (B) generating a plurality of second data on said first side of said bus by representing each respective one of said first data as (i) an index to one of said thresholds and (ii) a difference between said one threshold and said respective first data, wherein each of said second data is narrower than said respective first data and a width of said bus is narrower than said respective first data;
   (C) storing said thresholds and a plurality of items in a second memory on a second side of said bus;
   (D) transferring said second data on said bus from said first side to said second side;
   (E) selecting based on each of said indexes (i) one of said thresholds and (ii) one of said items; and
   (F) reconstructing said first data on said second side of said bus by adding said thresholds to said differences in response to said items.

12. The method according to claim 11, further comprising the step of:
   updating at least one of said thresholds in said first memory in response to said generating of at least two of said second data after said at least one threshold has been stored in said first memory.

13. The method according to claim 11, wherein (i) said first data comprises a first subset and a second subset having different data widths and (ii) said items indicate said data widths.

14. The method according to claim 11, wherein (i) said first data comprises a first subset and a second subset having different data types and (ii) said items indicate said data types.

15. The method according to claim 11, further comprising the step of:
   transferring at least one of said second data in at least two data transfers across said bus where said at least one second data is wider than said bus.

16. The method according to claim 11, wherein at least two of said thresholds have different bit widths.

17. The method according to claim 11, further comprising the step of:
   generating said thresholds by analyzing said first data on said first side of said bus.

18. The method according to claim 11, further comprising the step of:
   loading said thresholds into said first memory and said second memory from an external source.

19. The method according to claim 12, further comprising the step of:
   updating said at least one threshold in said second memory in response to said reconstructing of at least two of said first data after said at least one threshold has been stored in said second memory.

20. An apparatus comprising:
   means for storing a plurality of thresholds in a first memory on a first side of a bus, wherein each of said thresholds represents a respective one of a plurality of regular bit patterns in a plurality of first data;
   means for generating a plurality of second data on said first side of said bus by representing each respective one of said first data as (a) an index to one of said thresholds and (b) a difference between said one threshold and said respective first data, wherein each of said second data is narrower than said respective first data and a width of said bus is narrower than said respective first data;
   means for storing said thresholds and a plurality of items in a second memory on a second side of said bus;
   means for transferring said second data on said bus from said first side to said second side;
   means for selecting based on each of said indexes (i) one of said thresholds and (ii) one of said items; and
   means for reconstructing said first data on said second side of said bus by adding said respective thresholds to said differences in response to said items.

* * * * *